Sept. 30, 1952  N. S. REYNOLDS  2,612,419
PISTON SEALING ASSEMBLY
Filed March 12, 1949
FIG.-1
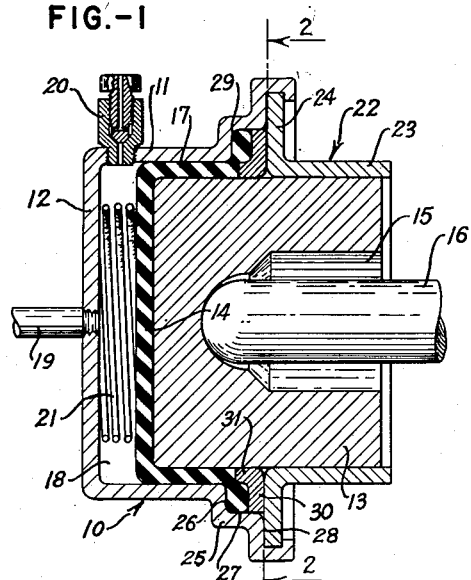
FIG.-2
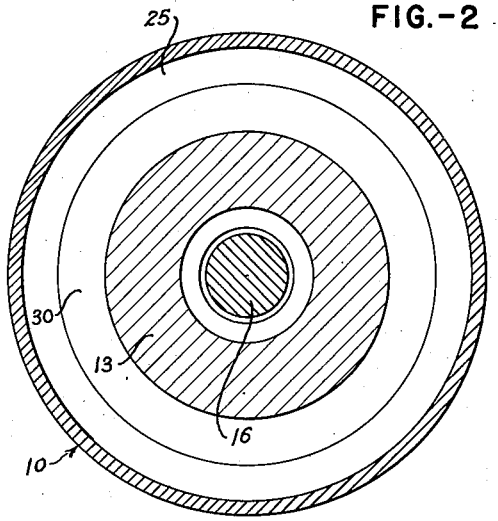
FIG.-3
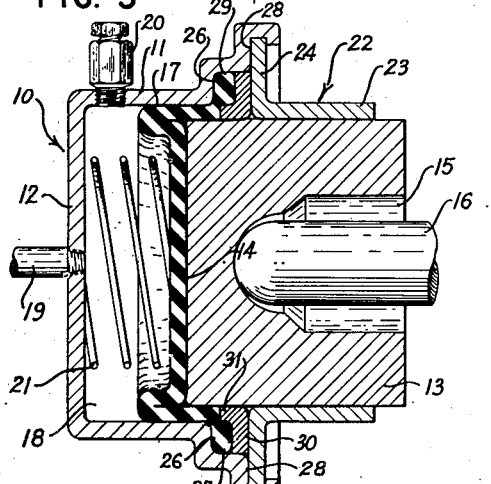
FIG.-4
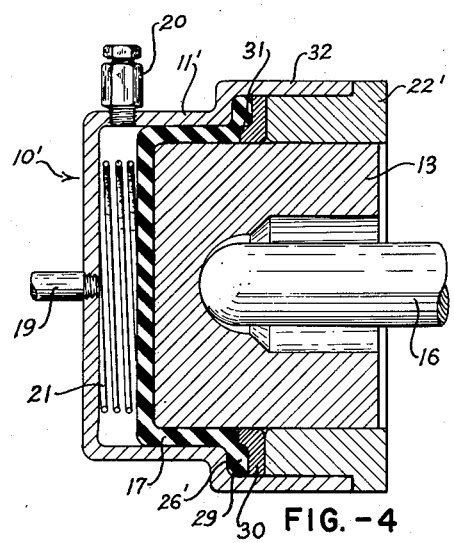
FIG.-5
*Inventor*
Noel S. Reynolds
BY
Lamphere and Van Valkenburgh
ATTORNEYS Patented Sept. 30, 1952

2,612,419

UNITED STATES PATENT OFFICE 2,612,419

PISTON SEALING ASSEMBLY

Noel S. Reynolds, St. Louis, Mo.

Application March 12, 1949, Serial No. 81,169

7 Claims. (Cl. 309—23)

This invention relates to piston and cylinder combinations and more particularly to an improved sealing means therefor.

One of the objects of the invention is to produce an improved sealing means of the diaphragm type for a piston and its cylinder.

Another object is to so associate a flexible sealing diaphragm of yieldable material with a piston and cylinder that when fluid pressure is effective to move the piston the diaphragm material will be under a compressing pressure and maintained against the piston head.

A further object is to so associate a flexible sealing diaphragm with a piston and cylinder that the diaphragm will have a cup-shaped form and surround and receive the entire head portion of the piston, thereby permitting the portion of the diaphragm covering the face of the piston to move with the piston and back in between the diaphragm walls by the diaphragm material "rolling back" on itself when fluid pressure is effective to move the piston.

Yet a further object is to provide improved means for securing a piston sealing diaphragm to a cylinder.

Still a further object is to so associate and connect a cup-shaped sealing diaphragm for a piston with a cylinder structure that the piston, when acted on by fluid pressure, can move freely and no "pinching" of the diaphragm material will be present.

Other objects of the invention will become apparent from the following description taken in connection with the accompanying drawing, in which:

Figure 1 is a longitudinal section view of a piston and cylinder combination having embodied therein a sealing diaphragm in accordance with my invention;

Figure 2 is a cross sectional view taken on line 2—2 of Figure 1;

Figure 3 is a sectional view similar to Figure 1, but showing the condition of the diaphragm when the piston is being moved under the action of fluid pressure;

Figure 4 is a longitudinal sectional view of a piston and cylinder combination showing a different manner of securing the diaphragm to the cylinder; and Figure 5 is a longitudinal sectional view showing a double piston assembly with sealing diaphragms embodied therein in accordance with the invention, said view also showing still another manner of securing the sealing diaphragm to the cylinder and providing guide means for piston movement.

Referring to the drawings in detail and first to Figures 1, 2 and 3, there is disclosed a piston sealing assembly which is primarily designed for operation of hydraulic brakes, but it is to be understood that the showing is by way of example only since the structure involved could be readily employed in a fluid motor designed for operating other appaartus besides hydraulic brakes. As shown, there is provided a cup-shaped cylinder member 10 having a cylindrical wall 11 and an end wall 12. Mounted for movement within the cylinder is a piston 13 of uniform diameter having a flat piston face 14, the diameter of which is the same as the piston. The rear portion of the piston has a recess 15 into which is received the spherical end of a piston rod 16, and by means of which a brake shoe (not shown) or some other member can be actuated.

The piston 13 is of smaller diameter than the diameter of the cylindrical wall 11 to thus provide a space for receiving the walls of a cup-shaped sealing diaphragm 17. The sealing diaphragm is made of a suitable flexible material such as rubber, synthetic rubber or the like and such may or may not be reinforced with fabric, meshed material or other material. This sealing diaphragm insures a positive sealing between the piston and the cylinder wall 11 as it is secured to the cylinder wall, as will become apparent, and covers the entire head of the piston. Between the end wall 12 of the cup-shaped member 10 and the diaphragm which covers the head portion of the piston, there will be established a chamber 18 which receives the fluid under pressure for actuating the piston. This chamber 18 is connected to a suitable source of pressure, such as a master cylinder, by means of a conduit 19, and in order that the chamber may be bled to eliminate any air or gas which may be therein, there is provided a suitable bleed valve 20 of well known construction. The chamber 18 also has positioned therein a coil spring 21 which is interposed between the wall of the diaphragm covering the piston face and the wall 12 of the cup-shaped cylinder member 10 so as to apply a constant force on the diaphragm and maintain the diaphragm against the piston face at all times and also maintain the piston and its piston rod in abutting relation.

The piston is arranged to be guided and primarily supported by a guide member or ring 22 which has a cylindrical portion 23, the internal diameter of which will be such that the piston will have a sliding fit therein. In addition to the cylindrical portion 23 of the guide ring, the ring has an annular outwardly extending flange 24, by means of which the guide member is secured to the cylinder member 10 and further will provide part of the means for clamping the diaphragm to the cylinder wall 11 of the member 10. The rear end of the cylinder wall 11 of the cup-shaped member is formed with a stepped portion 25 whereby a first shoulder 26, a cylindrical portion 27 and a second shoulder 28 is provided. The cup-shaped diaphragm 17 is formed at the open end thereof with an outwardly extending flange 29 which is arranged to be received in the stepped portion at the end of the cylinder wall 11 to abut against the first shoulder 26. This annular flange 29 of the diaphragm is arranged to be clamped tightly against the shoulder by means of a rigid packing ring 30 which is locked by the flange 24 on the piston guide member 22, the locking being brought about by the securing of the flange 24 to the outer portion of the stepped part of the cup-shaped member 10. The securing, as shown in Figure 1, is accomplished by turning the outer peripheral portion forming the second shoulder 28 over the flange 24 and thus clamping said flange tightly against the second shoulder 28. In order to produce a satisfactory holding or clamping action on the flange 29 of the diaphragm, the packing ring 30 has an annular flange 31 on its inner periphery, thus making the ring L-shaped in cross section. The inner diameter of this flange is substantially the same as the outer diameter of the piston and when the packing ring is in operative position, the flange will extend in a direction towards the diaphragm. Thus, when the packing ring is pressed tightly against the flange 29 of the diaphragm, the flange 31 of the ring will bite into the material of the flange at its juncture with the diaphragm wall and the result will be that flange 29 will become an annular knob which will resist any disconnection of the diaphragm from the cylinder wall 11. The flange 31 on the packing ring has a further function in that it will provide a rigid ring having a flat surface at right angles to the piston wall and an edge closely adjacent to the piston wall to thereby prevent diaphragm material from being "pinched" by the piston as it is actuated.

The construction shown in Figures 1 to 3 permits the cup-shaped cylinder member to be drawn from flat material by suitable dies. Also the guide ring or member 22 can be "drawn." The assembling of the various parts is easily accomplished and when the guide member is clamped to the cup-shaped cylinder member the diaphragm will be properly connected and sealed to the cylinder wall. The finishing of the inner cylindrical surface of the piston guide member 22 will be performed after assembly by boring or reaming and then honing. Thus, a good accurate cylindrical surface will be provided for the slidable supporting and guiding of the piston. By finishing the piston guide member after assembly, any deformation resulting from the clamping together of the guide member and cup-shaped cylinder can be corrected.

In operation, with the fluid motor assembled as shown, the diaphragm will be forced onto the piston head as fluid under pressure is caused to be effective in chamber 18. This will cause the piston to move rearwardly and thereby actuate a brake shoe or other device. As the piston moves rearwardly the bottom wall of the cup-shaped diaphragm will maintain engagement with the piston face 14 and move with it. As a result the wall of the diaphragm at its juncture with the bottom will be "peeled off" from the cylinder wall 11 and thereby "rolled back" on itself, as shown in Figure 13. Fluid pressure will tend to force the wall of the diaphragm axially in a rearward direction, but pinching by the piston will be prevented by the packing ring 30 and its flange. As the piston continues to be actuated by fluid pressure, the "rolling action" of the diaphragm wall will continue until the diaphragm assumes a "turned inside out" condition. When fluid pressure is relieved, the piston will be returned to its normal inoperative position and the diaphragm will be as shown in Figure 1. The return of the piston can be accomplished by any suitable retracting force such as that created by a spring (not shown). The normal inoperative position of the piston may be such that the side walls of the diaphragm will be slightly stretched. In instances where the fluid motor is employed to operate a brake shoe, the inoperative position of the piston will change, due to brake shoe adjustment to take care of lining wear. If adjustment results in the inoperative position of the piston being at or near the position illustrated in Figure 3, then the diaphragm will have a normal inoperative position as shown in Figure 3, that is, the walls will be partially "rolled back." The spring 21 will act to maintain the bottom wall of the diaphragm against the piston face and this spring action will be assisted by slight pressure of fluid in chamber 18 which will be present in hydraulic brake systems in their inoperative condition, as is well known.

The diaphragm sealing structure for the piston, as described, insures that the piston and cylinder will be positively sealed. No air can be pulled in around the diaphragm, as is possible when packing cups are employed. The diaphragm, as constructed and assembled, permits long piston travel without any stretching of the diaphragm material. This will insure longer life. The diaphragm material will be under compression during movement of the piston. The diaphragm material will be flexed, due to the "rolling back" action, but with the proper selection of the diaphragm material this flexing will not result in damage to shorten the life of the diaphragm. If desired, the piston head can be lubricated so that friction will be minimized as the piston head slides relatively to the diaphragm side walls.

In Figure 4 there is shown a slightly modified fluid motor assembly. In place of the formed piston guide ring 22 there is provided a ring 22′ which can be cast. The cup-shaped cylinder member 10′ is shaped so that its cylinder wall 11′ has only the first shoulder 26′ against which the diaphragm flange 29 is clamped. Extending rearwardly from the cylinder wall 11′ is an enlarged cylindrical portion 32 which is to be shrunk onto or otherwise secured, as by welding, to the outer surface of the piston guide ring 22′. The diaphragm flange 29 will then be clamped against the shoulder 26 by the packing ring 30 and locked there by the connection between the guide ring 22′ and the enlarged cylindrical portion 32. The inner cylindrical surface of the guide can be finished after assembly. All the other parts of the motor are the same as previously described in Figures 1 to 3 and are indicated by like numerals.

The operation of the fluid motor of Figure 4 is the same as that shown in Figures 1 to 3. The Figure 4 construction does, however, permit a cast piston guide member to be used where such is found desirable.

In Figure 5 a double piston fluid motor is shown and illustrates how my invention can be embodied in such a motor. This motor also shows a cast cylinder instead of a formed cylinder and the manner in which the piston guide member can be attached thereto and clamp the diaphragm to the cylinder. As shown, the cylinder 33 is open at both ends. Each end has a flange 34 to which piston guide members 35 are attached by having their flanges 36 turned over the flanges 34. The two pistons 37 of identical structure are mounted for sliding movement on the guide members, said pistons actuating members such as brake shoes by means of piston rods 38. The diaphragms 39 for each piston are cup-shaped and identical to the diaphragms already described. The flange 40 of each diaphragm is clamped to the cylinder 33 by a packing ring 41 of L-shaped cross section, said ring being locked in clamping position by the connection between the piston guide member and the cylinder 33. A spring 42 is interposed between the piston heads in the fluid pressure receiving chamber 43. Fluid under pressure is admitted to the chamber by a suitable conduit connected to an inlet 44. An outlet 45 is also provided with which is associated a bleeder valve.

In this double piston motor shown in Figure 5, the diaphragms function to provide a positive seal between the cylinder and the pistons. As fluid pressure is caused to be effective in chamber 43, both pistons will be simultaneously moved outwardly away from each other. The bottoms of the diaphragms will follow the pistons and the "roll back" action of the side walls will take place in a manner already described in connection with the fluid motor of Figures 1 to 3. A spring (not shown) will retract the pistons when the fluid pressure is released.

I have illustrated several fluid motors in which my invention is embodied. These motors show different manners of constructing cylinders, piston guides, attaching said parts and further clamping my improved diaphragm to the cylinders. Therefore, being aware of the possibility of modification in fluid motor construction to embody my invention therein without departing from the fundamental principles thereof, it is not intended that the scope of the invention be limited in any manner except as set forth by the appended claims.

What is claimed is:

1. In apparatus of the class described, a fluid pressure receiving cylinder, a piston having a head portion of uniform diameter and with its diameter smaller than the cylinder to thereby provide a space between the cylinder and the wall of the piston head, a cup-shaped diaphragm covering the piston head and having a side wall of flexible material positioned in and filling the space between the cylinder wall and the piston head wall when the piston is in inoperative position, and means for securing the wall of the cup-shaped diaphragm adjacent its open end to the cylinder wall in fluid tight relation, said cup-shaped diaphragm when acted upon by fluid pressure in the cylinder to cause movement of the piston toward the open end of the diaphragm causing the bottom wall of the diaphragm to move with the piston as a unit and the wall of the diaphragm to be turned back on itself by a "rolling" action.

2. In apparatus of the class described, a fluid pressure receiving cylinder, a piston having a head portion of uniform diameter and with its diameter smaller than the cylinder to thereby provide a space between the cylinder and the wall of the piston head, a cup-shaped diaphragm covering the piston head and having a side wall of flexible material positioned in and filling the space between the cylinder wall and the piston head wall when the piston is in inoperative position, means for securing the wall of the cup-shaped diaphragm adjacent its open end to the cylinder wall in fluid tight relation, said cup-shaped diaphragm when acted upon by fluid pressure in the cylinder to cause movement of the piston toward the open end of the diaphragm causing the bottom wall of the diaphragm to move with the piston as a unit and the wall of the diaphragm to be turned back on itself by a "rolling" action, and spring means acting on the bottom wall of the cup-shaped diaphragm in the direction of the piston face.

3. In apparatus of the class described, a piston having a head portion of uniform diameter, a sealing means therefor comprising a cup-shaped diaphragm member of flexible material surrounding the entire head portion of the piston including its side wall, a cylinder for receiving fluid under pressure, said cylinder being of such a diameter greater than the piston head portion and the wall of the cup-shaped diaphragm being of such thickness that the space between the cylinder and piston head portion will be filled by diaphragm material from the forwardmost point of the piston face rearwardly when the piston is in inoperative position, and means for securing the rear end of the cup-shaped member to the cylinder.

4. In apparatus of the class described, a piston having a head portion of uniform diameter, a sealing means therefor comprising a cup-shaped diaphragm member of flexible material surrounding the entire head portion of the piston including its side wall, a cylinder for receiving fluid under pressure, said cylinder being of such a diameter greater than the piston head portion and the wall of the cup-shaped diaphragm being of such thickness that the space between the cylinder and piston head portion will be filled by diaphragm material from the forwardmost point of the piston face rearwardly when the piston is in inoperative position, and means for securing the rear end of the cup-shaped member to the cylinder including a member having a cylindrical portion providing guide means for the piston.

5. In apparatus of the class described, a cylinder unit, a piston mounted therein and a cup-shaped sealing diaphragm of flexible material covering the head portion of the piston, said cylinder unit being constructed with a first cylinder portion having such a diameter greater than the diameter of the head portion of the piston that the wall of the cup-shaped diaphragm can be received in the space between said cylinder portion and the side wall of the head portion of the piston, said wall of the cup-shaped diaphragm filling said space when the piston is in inoperative position and as the piston is operated a "rolling action" of the wall will take place, and a second cylinder portion having a diameter so related to the piston diameter rearward of the head portion that the piston has a close sliding fit therein, and means for securing the rear end of the cup-shaped diaphragm between the two cylinder portions and comprising a separate ring having an axially extending flange, an outwardly extending flange on the end of the wall of diaphragm and a shoulder on the first cylinder portion against which the ring can clamp the diaphragm flange, said flange of the ring extending beneath the diaphragm flange and being of a diameter to closely fit the piston to prevent "pinching" of the diaphragm material and also act as a fixed guide for the piston.

6. In combination, a fluid pressure cylinder, a piston movable within the cylinder from a first position to a second position, a flexible sealing cup disposed over the piston head and having its open end secured in sealing relation to the wall of the cylinder, the end wall of the cup being engageable with the fluid pressure receiving end of the piston, the side walls of the piston and cylinder adjacent the cup being so spaced as to closely receive the side wall of the cup therebetween when the piston is in inoperative position, said cup having its walls made of flexible material so that the fluid pressure will urge the end wall of the cup against the end of the piston and as the piston is moved from first to second position by fluid pressure, the flexible side wall of the cup will flex and turn back upon itself.

7. In combination, a cylinder having an open end of which extends outwardly in a stepped manner, a piston within the cylinder, a cup-shaped diaphragm of flexible material having a flanged end and being slidably fitted over the end of the piston adjacent the closed end of the cylinder, said diaphragm having the flange abutting the stepped end of the cylinder, the wall of said diaphragm forwardly of the stepped end of the cylinder filling the space between the piston wall and cylinder when the piston is inoperative and said wall having a "rolling action" as the piston is operated, a separate ring member abutting the other side of the flange of said diaphragm and closely engaging the piston to prevent "pinching" of the diaphragm, and a cylindrical member abutting said ring member and secured to the end of the cylinder, said cylindrical member and said ring also acting as fixed guides for the piston during movement thereof.

NOEL S. REYNOLDS.

REFERENCES CITED

The following references are of record in the file of this patent:

UNITED STATES PATENTS

| Number | Name | Date |
|---|---|---|
| 1,845,939 | Sowden | Feb. 16, 1932 |
| 1,945,524 | Foehr | Feb. 6, 1934 |
| 1,964,745 | Sauzedde | July 3, 1934 |
| 1,970,398 | Schwarz | Aug. 14, 1934 |
| 2,034,538 | Schnell | Mar. 17, 1936 |
| 2,170,574 | Sauzedde | Aug. 22, 1939 |
| 2,313,486 | Gratzmuller | Mar. 9, 1943 |

FOREIGN PATENTS

| Number | Country | Date |
|---|---|---|
| 324,513 | France | Dec. 13, 1902 |